United States Patent
Leveque et al.

(10) Patent No.: US 12,060,463 B2
(45) Date of Patent: Aug. 13, 2024

(54) PROCESS FOR MANUFACTURING HEAT TREATED PVDF

(71) Applicant: SOLVAY SPECIALTY POLYMERS ITALY S.P.A., Bollate (IT)

(72) Inventors: Emmanuel Leveque, Tavaux (FR); Marinella Marcucci, Pietrasanta (IT); Daniele Facchi, Rovato (IT); Federica Rusconi, Milan (IT); Julio A. Abusleme, Saronno (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 616 days.

(21) Appl. No.: 17/293,971

(22) PCT Filed: Nov. 20, 2019

(86) PCT No.: PCT/EP2019/081904
§ 371 (c)(1),
(2) Date: May 14, 2021

(87) PCT Pub. No.: WO2020/104513
PCT Pub. Date: May 28, 2020

(65) Prior Publication Data
US 2022/0002501 A1  Jan. 6, 2022

(30) Foreign Application Priority Data

Nov. 22, 2018 (EP) .................................. 18306544

(51) Int. Cl.
| | |
|---|---|
| *C08J 3/12* | (2006.01) |
| *H01M 4/36* | (2006.01) |
| *H01M 4/62* | (2006.01) |
| *H01M 50/403* | (2021.01) |
| *H01M 50/426* | (2021.01) |
| *H01M 50/449* | (2021.01) |
| *H01M 50/417* | (2021.01) |

(52) U.S. Cl.
CPC ............... *C08J 3/12* (2013.01); *H01M 4/366* (2013.01); *H01M 4/623* (2013.01); *H01M 50/403* (2021.01); *H01M 50/426* (2021.01); *H01M 50/449* (2021.01); *C08J 2327/16* (2013.01); *H01M 50/417* (2021.01)

(58) Field of Classification Search
None
See application file for complete search history.

(56) References Cited

U.S. PATENT DOCUMENTS

| | | | |
|---|---|---|---|
| 6,203,944 B1 | 3/2001 | Turner et al. | |
| 9,478,780 B2* | 10/2016 | Inaba ................. | H01M 50/403 |
| 10,227,429 B2* | 3/2019 | Watanabe ......... | H01M 10/0565 |
| 2010/0133482 A1* | 6/2010 | Abusleme .............. | B01D 71/76 |
| | | | 252/511 |
| 2012/0208085 A1* | 8/2012 | Igarashi ............... | C08K 5/3415 |
| | | | 429/211 |
| 2012/0213915 A1* | 8/2012 | Igarashi ................. | H01G 11/56 |
| | | | 524/545 |

FOREIGN PATENT DOCUMENTS

| | | | |
|---|---|---|---|
| EP | 2495273 A1 | | 9/2012 |
| KR | 20040078072 A | * | 9/2004 |
| WO | 2000003444 A1 | | 1/2000 |

OTHER PUBLICATIONS

Machine translation of KR 20040078072 A, retrieved Jan. 2024 (Year: 2024).*

* cited by examiner

*Primary Examiner* — Nicole M. Buie-Hatcher
(74) *Attorney, Agent, or Firm* — Osha Bergman Watanabe & Burton LLP

(57) ABSTRACT

The present invention relates to a process for producing heat-treated vinylidene fluoride polymer particles which exhibit excellent dispersibility and solubility in aprotic polar solvents, improved colour and are less prone to agglomeration and to uses of said vinylidene fluoride polymer particles in electrodes or separators in electrochemical devices and in filtration membranes. The process comprises providing an aqueous dispersion of the VDF-based polymer particles, thermally treating it under stirring and isolating the heat-treated polymer particles.

5 Claims, No Drawings

PROCESS FOR MANUFACTURING HEAT TREATED PVDF

CROSS-REFERENCE TO RELATED APPLICATIONS

This application is a U.S. national stage entry under 35 U.S.C. § 371 of International Application No. PCT/EP2019/081904 filed Nov. 20, 2019, which claims priority to European patent application No. 18306544.0, filed on Nov. 22, 2018. The entire contents of these applications are explicitly incorporated herein by this reference.

TECHNICAL FIELD

The present invention relates to a process for producing heat-treated vinylidene fluoride polymer particles which exhibit excellent dispersibility and solubility in aprotic polar solvents, improved colour and are less prone to agglomeration and to uses of said vinylidene fluoride polymer particles in various applications.

BACKGROUND ART

Fluoropolymers are known in the art to be excellent materials used in a variety of applications and environments due to their intrinsic chemical resistance and good mechanical properties.

In particular, fluoropolymers are known in the art to be suitable for the manufacture of components for electrochemical devices such as electrodes or separators for secondary batteries.

Also, fluoropolymers are known in the art to be suitable for the manufacture of filtration membranes.

Generally, techniques for manufacturing either electrodes or separators for secondary batteries or filtration membranes involve the use of organic solvents such as N-methyl-2-pyrrolidone for dissolving fluoropolymers.

In particular, fluoropolymers are suitable as binders in a process for the manufacture of electrodes, wherein said fluoropolymer binders are dissolved in an organic solvent such as N-methyl-2-pyrrolidone and then homogenized with an electroactive material and all other suitable components to produce a paste to be applied to a current collector.

The role of the organic solvent is typically to dissolve the fluoropolymer in order to bind the electroactive material particles to each together and to the current collector upon evaporation of the organic solvent.

The fluoropolymer binder should properly bind the electroactive material particles together and to the current collector so that these particles can chemically withstand large volume expansion and contraction during charging and discharging cycles.

In particular, vinylidene fluoride polymers, especially vinylidene fluoride polymers having high molecular weight, are suitable as binders for electrodes in view of their good adhesion properties to the current collector.

Also, vinylidene fluoride polymers having high molecular weight are suitable for use in the manufacture of filtration membranes having good mechanical strength.

Conventionally, a "good" solvent having adequate dissolving power with respect to a vinylidene fluoride polymer is selected and the mixture is stirred with heating, as necessary, to prepare a uniform solution. However, since the vinylidene fluoride polymer powder tends to aggregate during the stirring, permeation of the solvent into the aggregates to completely dissolve the powders to obtain a uniform solution requires a long time.

This tendency is stronger in vinylidene fluoride polymer with higher molecular weight, which requires longer time to be dissolved in organic solvents such as NMP or acetone, thereby deteriorating the productivity.

It is known that the thermally treating vinylidene fluoride polymer particles at a temperature somehow lower than the melting temperature of the polymer renders said vinylidene fluoride polymer particles much easier to be dissolved in a given solvent.

EP2495273, May 9, 2012, discloses a process for producing heat-treated vinylidene fluoride polymer powder comprising heat treating the powder at a temperature not less than 125° C. to less than the crystal melting temperature (Tm) of the polymer with the aim of improving the dispersibility and solubility of the powder in aprotic polar solvents such as NMP.

Suitable heat-treatment equipment known in the art includes for example, ovens (such as static, continuous, batch, convection), fluid bed heaters or the like.

However, heat-treating powdered material can affect the colour of the material.

Moreover, in the heat treatment of a material in powder form agglomeration of said powder material is very likely to occur. As a consequence, besides having a non-homogeneous heat treatment, a grinding step is often needed after the heat treatment to restore the appropriate particle size. In addition to the fact that an additional step entails higher costs and longer times in the industrial process, a grinding step may also cause some spot heating of the polymer composition, and if this temperature exceeds the melting point of the polymer, the crystallinity and consequently the solubility of the polymer may be affected.

Furthermore, vinylidene fluoride polymers in the form of powder may ignite when handled at elevated temperatures.

There is thus still a need in the art to manufacture vinylidene fluoride polymers particles having high molecular weight which may be readily dissolved in organic solvents thereby providing homogeneous organic solvent solutions, while at the same time overcome the problems of productivity, safety and of colour mentioned above.

SUMMARY OF INVENTION

The Applicant has surprisingly found that a thermal treatment may be easily and conveniently carried out on an aqueous dispersion of vinylidene fluoride polymer as a step in the process for manufacturing (semi)-crystalline vinylidene fluoride polymer particles which may be easily dissolved in organic solvents.

It has also been found that a homogeneous solution of these (semi)-crystalline vinylidene fluoride polymer particles in various organic solvents may be easily obtainable, which may be advantageously processed into articles having homogeneous properties.

In a first instance, the present invention pertains to a process for manufacturing (semi)-crystalline vinylidene fluoride (VDF) polymer particles [polymer ($F_f$) particles], said process comprising:

(i) providing an aqueous dispersion [dispersion (D)] consisting of an aqueous medium and particles of at least one (semi)-crystalline VDF-based polymer [polymer (F) particles];

(ii) thermally treating the dispersion (D) provided in step (i) a temperature comprised in the range from 100 to 180° C., preferably from 110 and 160° C., under stirring; and (iii) isolating polymer ($F_f$) particles from the thermally treated dispersion obtained in step (ii).

In a second instance, the present invention pertains to one or more (semi)-crystalline vinylidene fluoride (VDF) polymer particles [polymer ($F_f$) particles] obtainable by the process of the invention.

In a third instance, the present invention pertains to a composition [composition (C)] comprising:
one or more polymer ($F_f$) particles of the invention, and
a liquid medium comprising one or more organic solvents.

DESCRIPTION OF EMBODIMENTS

As used within the present description and in the following claims:
the expression "(semi)-crystalline polymer" is intended to indicate a polymer having a heat of fusion of more than 1 J/g, more preferably from 35 J/g to 1 J/g, even more preferably from 15 to 5 J/g, when measured by Differential Scanning calorimetry (DSC) at heating rate of 10°/min, according to ASTM D-3418;
the term "dispersion (D)" is intended to indicate an aqueous dispersion comprising particles of at least one polymer (F), said particles having a size distribution with a D50 value of from 10 to 1000 µm, preferably from 50 to 500 µm.

The term "aqueous medium" in dispersion (D) is used to include water and water combined with other ingredients, such as, for example, wetting agents and surfactants. As the wetting agent, mention can be made to polyhydric alcohols. As the surfactant, any of a cationic surfactant, an anionic surfactant, an amphoteric surfactant and a non-ionic surfactant can be used.

Preferably, the aqueous medium in dispersion (D) essentially contains water.

In one embodiment of the present invention, polymer (F) particles in dispersion (D) are wet polymer (F) particles [polymer (WF) particles].

Polymer (WF) particles are obtainable by polymerization, typically by suspension polymerization or by supercritical suspension polymerization, in a polymerization medium comprising vinylidene fluoride (VDF), optionally, at least one fluorinated monomer different from vinylidene fluoride (VDF), and, optionally, at least one hydrogenated monomer.

Said polymerization for manufacturing the polymer (WF) particles is typically carried out at a temperature of at least 10° C., preferably of at least 25° C., more preferably of at least 45° C. The polymerization is typically carried out at a temperature of at most 140° C., preferably of at most 100° C., more preferably of at most 80° C. and at a pressure of at least 25 bar, preferably of at least 50 bar, more preferably of at least 75 bar.

Said polymerization is typically carried out in the presence of a radical initiator. The radical initiator may be an organic radical initiator or an inorganic radical initiator.

The radical initiator is typically selected from the group consisting of:
bis-acylperoxides of formula ($R_f$—CO—O)$_2$, wherein $R_f$ is a $C_1$-$C_{10}$ (per)haloalkyl group or a perfluoropolyoxyalkylene group, bis-trichloroacetylperoxide and bis-dichlorofluoro acetylperoxide being particularly preferred;

dialkylperoxides of formula ($R_H$—O)$_2$, wherein $R_H$ is a $C_1$-$C_{10}$ alkyl group, diterbutylperoxide (DTBP) being particularly preferred;
water soluble inorganic peroxides, such as ammonium or alkaline metals persulphates or perphosphates, sodium and potassium persulphate being particularly preferred;
dialkylperoxydicarbonates, wherein the alkyl group has from 1 to 8 carbon atoms, such as di-n-propyl-peroxydicarbonate and di-isopropyl-peroxydicarbonate;
alkyl peroxyesters, such as tert-amylperoxypivalate and tert-butylperoxyisobutirate; and
organic or inorganic redox systems, such as ammonium persulphate/sodium sulphite, hydrogen peroxide/aminoiminomethansulphinic acid, terbutylhydroperoxide/metabisulphite.

The polymerization medium in said polymerization for manufacturing the polymer (WF) particles typically comprises an organic phase to which water is usually added in order to favour the heat dispersion developing during the reaction. The organic phase may be formed by the monomer(s) themselves, without addition of solvents, or by the monomer(s) dissolved in a suitable organic solvent.

At the end of the polymerization, the solid particles are separated, usually by filtration, from the polymerization medium and submitted to repeated washings with fresh water so as to obtain almost complete replacement of the residual polymerization medium with fresh water, thus providing polymer (WF) particles.

In another embodiment of the present invention, polymer (F) particles in dispersion (D) are dry polymer (F) particles [polymer (DF) particles].

Polymer (DF) particles are obtained by drying the polymer (WF) particles, preferably at a temperature comprised between 30° C. and 120° C., preferably between 50° C. and 90° C., to provide the same in the form of powder particles.

In this embodiment, the dispersion (D) can be obtained by dispersing dried polymer (DF) particles in an aqueous medium suitably comprising a wetting agent to facilitate the dispersion of the powder. The wetting agent can be selected from at least one alcohol, at least one ionic surfactant, at least one non-ionic surfactant, or mixtures thereof.

Preferably, the polymer (F) particles contained in dispersion (D) are polymer (WF) particles as above defined, that is, wet particles of at least one (semi)-crystalline VDF-based polymer that have not being subjected to drying at the end of the polymerization for the manufacturing thereof.

Thus, dispersion (D) may conveniently be obtained without any energy and time demanding drying process.

Preferably, the dispersion (D) used in step (i) of the process of the invention has a solid content of polymer (F) dispersed in an aqueous medium, preferably dispersed in water, ranging from 5 to 50% by weight.

Solid content of polymer (F) in dispersion (D) may be conveniently adjusted by addition or elimination of water to reach the desired percentage by weigh.

The said solid content of polymer (F) dispersed in an aqueous medium allows a very efficient stirring of dispersion (D) during step (ii) of the process, which keeps the particles (F) well dispersed in the aqueous medium while thermally treated.

The efficient stirring of dispersion (D) in step (ii) of the process allows for a very homogeneous thermal treatment of polymer (F) to be achieved.

Step (ii) of the process of the invention for manufacturing the polymer ($F_f$) particles is typically carried out at a temperature of at least 100° C., preferably of at least 110° C., more preferably of at least 120° C.

Step (ii) of the process of the invention for manufacturing the polymer ($F_f$) particles is typically carried out at a temperature of at most 180° C., preferably of at most 160° C., more preferably of at most 150° C.

Step (ii) of the process of the invention for manufacturing the polymer ($F_f$) particles is typically carried out at a pressure which is above the atmospheric pressure.

A pressure above the atmospheric pressure may be established by carrying out the thermal treatment of step (ii) within a vessel that may be pressurized by the inner pressure generated by the water comprised in dispersion (D) heated above 100° C.

Optionally, higher pressure inside the vessel can be obtained by be pressurized with at least one additional incondensable gas, such as air or nitrogen, when aiming at increasing inner pressure therein.

Step (ii) of the process of the invention for manufacturing the polymer ($F_f$) particles is typically carried out for a time ranging from 5 to 6000 minutes, preferably from 10 to 200 minutes, more preferably from 30 to 90 minutes.

In step (iii) of the process of the invention, polymer ($F_f$) particles are isolated from the thermally treated dispersion (D).

Isolation of polymer ($F_f$) particles in step (iii) is typically carried out by filtration.

Polymer ($F_f$) particles obtained in step (iii) of the process may be submitted to a washing step with an aqueous medium, so to remove possible residual impurities.

In one preferred embodiment of the invention it is provided a process for manufacturing one or more (semi)-crystalline vinylidene fluoride (VDF) polymer particles [polymer ($F_f$) particles], said process comprising:
 (i) providing an aqueous dispersion [dispersion (D)] consisting of an aqueous medium and particles of at least one (semi)-crystalline VDF-based polymer [polymer (F)];
 (ii) thermally treating the dispersion (D) provided in step (i) in a closed vessel at a temperature comprised in the range from 100 to 180° C., preferably from 110 and 160° C., under stirring;
 (iii) isolating polymer ($F_f$) particles from the thermally treated dispersion obtained in step (ii); and
 (iv) submitting polymer ($F_f$) particles obtained in step (iii) to a washing step with an aqueous medium.

Preferably, the aqueous medium in washing step (iv) essentially contains water.

Polymer ($F_f$) particles isolated from the thermally treated dispersion (D) are typically subjected to drying.

Drying of polymer ($F_f$) particles is conveniently carried out in a fluidized bed, at a temperature above 50° C., preferably above 80° C.

The Applicant has surprisingly found that drying polymer ($F_f$) particles is much more effective in terms of energy required and in terms of timing in comparison with drying polymer (F) particles not submitted to the thermal treatment of the process of the present invention. Moreover, the thermally treated polymer (F) particles renders the fluidization of the thus obtained powder more efficient.

The Applicant thinks, without this limiting the scope of the invention, that due to changes in polymer conformation during the process of the invention, the polymer ($F_f$) particles obtained by the process of the invention advantageously exhibit a higher solubility.

In a second instance, the present invention pertains to one or more (semi)-crystalline vinylidene fluoride (VDF) polymer particles [polymer ($F_f$) particles] obtainable by the process of the invention.

The polymer ($F_f$) particles of the invention typically have an intrinsic viscosity of at least 0.13 l/g, preferably of at least 0.15 l/g, more preferably of at least 0.20 l/g.

The intrinsic viscosity of the polymer ($F_f$) particles is typically measured at 25° C. in N,N-dimethylformamide.

The polymer ($F_f$) particles of the invention are typically in the form of powder particles.

The polymer ($F_f$) particles are typically in the form of powder particles, typically having a size distribution with a D50 value of at least 10 μm, preferably at least 30 μm, more preferably at least 60 μm.

The D50 value is used herein according to its usual meaning and thus represents the diameter at which 50% of the particles in a sample are smaller than the D50 value and the remaining 50% of the particles are larger than said D50 value.

The particle size distribution is determined by laser diffraction by measuring the angular variation in intensity of light scattered as a laser beam passes through a dispersed particulate sample. The particle size is reported as a volume equivalent sphere diameter.

The polymer ($F_f$) particles of the invention are typically free from one or more (semi)-crystalline VDF polymer particles in the form of fine powder particles having an average size smaller than 3 μm, preferably smaller than 5 μm.

Each of the polymer (F) and the polymer ($F_f$) typically further comprises recurring units derived from at least one fluorinated monomer different from vinylidene fluoride (VDF) and, optionally, recurring units derived from at least one hydrogenated monomer.

However, it is preferred that each of the polymer (F) and the polymer ($F_f$) comprises at least 70% by moles of recurring units derived from vinylidene fluoride (VDF), wherein the molar amounts of said recurring units are relative to the total moles of recurring units in said polymer (F) and said polymer ($F_f$).

For the purpose of the present invention, the term "fluorinated monomer" is intended to denote an ethylenically unsaturated monomer comprising at least one fluorine atom.

For the purpose of the present invention, the term "hydrogenated monomer" is intended to denote an ethylenically unsaturated monomer comprising at least one hydrogen atom and free from fluorine atoms.

Should the fluorinated monomer comprise at least one hydrogen atom, it is designated as hydrogen-containing fluorinated monomer.

Should the fluorinated monomer be free of hydrogen atoms, it is designated as per(halo)fluorinated monomer.

The fluorinated monomer may further comprise one or more other halogen atoms (Cl, Br, I).

Non-limiting examples of suitable fluorinated monomers include, notably, the followings:
 $C_2$-$C_8$ perfluoroolefins such as tetrafluoroethylene and hexafluoropropylene (HFP);
 $C_2$-$C_8$ hydrogenated fluoroolefins such as vinyl fluoride, 1,2-difluoroethylene and trifluoroethylene;
 perfluoroalkylethylenes of formula $CH_2=CH-R_{f0}$ wherein $R_{f0}$ is a $C_1$-$C_6$ perfluoroalkyl;
 chloro- and/or bromo- and/or iodo-$C_2$-$C_6$ fluoroolefins such as chlorotrifluoroethylene;
 (per)fluoroalkylvinylethers of formula $CF_2=CFOR_{f1}$ wherein $R_{f1}$ is a $C_1$-$C_6$ fluoro- or perfluoroalkyl, e.g. $CF_3$, $C_2F_5$, $C_3F_7$;
 $CF_2=CFOX_0$ (per)fluoro-oxyalkylvinylethers wherein $X_0$ is a $C_1$-$C_{12}$ alkyl group, a $C_1$-$C_{12}$ oxyalkyl group or a $C_1$-$C_{12}$ (per)fluorooxyalkyl group having one or more ether groups, such as perfluoro-2-propoxy-propyl group;

(per)fluoroalkylvinylethers of formula $CF_2=CFOCF_2OR_{f2}$ wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group having one or more ether groups such as —$C_2F_5$—O—$CF_3$;

functional (per)fluoro-oxyalkylvinylethers of formula $CF_2=CFOY_0$ wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups and $Y_0$ comprising a carboxylic or sulfonic acid group, in its acid, acid halide or salt form; and fluorodioxoles, preferably perfluorodioxoles.

Each of the polymer (F) and the polymer ($F_f$) preferably comprises:

(a) at least 60% by moles, preferably at least 75% by moles, more preferably at least 85% by moles of recurring units derived from vinylidene fluoride (VDF), (b) optionally, from 0.1% to 15% by moles, preferably from 0.1% to 12% by moles, more preferably from 0.1% to 10% by moles of recurring units derived from at least one fluorinated monomer (F), and (c) optionally, recurring units derived from at least one hydrogenated monomer, wherein the molar amounts of said recurring units are relative to the total moles of recurring units in said polymer (F) and said polymer ($F_f$).

The hydrogenated monomer may be a functional hydrogenated monomer.

For the purpose of the present invention, the term "functional hydrogenated monomer" is intended to denote a hydrogenated monomer comprising at least one functional end group.

Each of the polymer (F) and the polymer ($F_f$) comprises preferably at least 0.01% by moles, more preferably at least 0.05% by moles, even more preferably at least 0.1% by moles of recurring units derived from at least one functional hydrogenated monomer, wherein the molar amounts of said recurring units are relative to the total moles of recurring units in said polymer (F) and said polymer ($F_f$).

Each of the polymer (F) and the polymer ($F_f$) comprises preferably at most 20% by moles, more preferably at most 15% by moles, even more preferably at most 10% by moles, most preferably at most 3% by moles of recurring units derived from at least one functional hydrogenated monomer, wherein the molar amounts of said recurring units are relative to the total moles of recurring units in said polymer (F) and said polymer ($F_f$).

Determination of average mole percentage of recurring units derived from at least one functional hydrogenated monomer in the (semi)-crystalline vinylidene fluoride polymer can be performed by any suitable method. Mention can be notably made of acid-base titration methods or NMR methods.

The functional hydrogenated monomer typically comprises at least one functional end group selected from a hydroxyl end group and a carboxylic acid end group.

The functional hydrogenated monomer is preferably selected from the group consisting of (meth)acrylic monomers of formula (I) and vinylether monomers of formula (II):

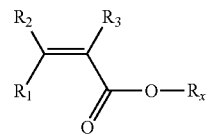

(I)

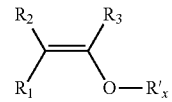

(II)

wherein each of $R_1$, $R_2$ and $R_3$, equal to or different from each other, is independently a hydrogen atom or a $C_1$-$C_3$ hydrocarbon group, $R_X$ is a hydrogen atom or a $C_1$-$C_5$ hydrocarbon group comprising at least one hydroxyl group and $R'_X$ is a $C_1$-$C_5$ hydrocarbon group comprising at least one hydroxyl group.

The functional hydrogenated monomer is more preferably of formula (I) as defined above.

The functional hydrogenated monomer is even more preferably of formula (I-A):

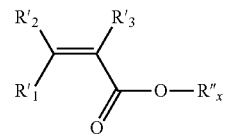

(I-A)

wherein $R'_1$, $R'_2$ and $R'_3$ are hydrogen atoms and $R''_X$ is a hydrogen atom or a $C_1$-$C_5$ hydrocarbon group comprising at least one hydroxyl group.

Non-limiting examples of (meth)acrylic monomers of formula (I) include, notably, acrylic acid, methacrylic acid, hydroxyethyl(meth)acrylate, hydroxypropyl(meth)acrylate, hydroxyethylhexyl(meth)acrylate.

The (meth)acrylic monomer of formula (I) is more preferably selected from the followings:

acrylic acid (AA) of formula:

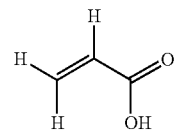

hydroxyethyl acrylate (HEA) of formula:

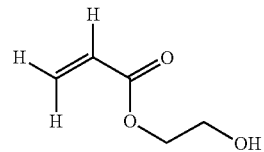

2-hydroxypropyl acrylate (HPA) of either of formulae:

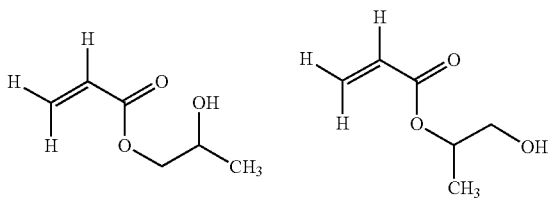

and mixtures thereof.

In a third instance, the present invention pertains to a composition [composition (C)] comprising:
one or more polymer ($F_f$) particles of the invention, and
a liquid medium comprising one or more organic solvents.

The composition (C) of the invention typically comprises:
from 0.5% to 50% by weight, preferably from 1% to 30% by weight, more preferably from 5% to 20% by weight, with respect to the total weight of the composition (C), of one or more polymer ($F_f$) particles of the invention, and
from 99.5% to 50% by weight, preferably from 99% to 70% by weight, more preferably from 95% to 80% by weight, with respect to the total weight of the composition (C), of a liquid medium comprising one or more organic solvents.

The composition (C) of the invention is typically obtainable by dispersing one or more polymer ($F_f$) particles of the invention in a liquid medium comprising one or more organic solvents.

The composition (C) of the invention is advantageously a homogenous solution.

The term "solution" is hereby intended to denote a clear homogeneous solution of (semi)-crystalline VDF polymer particles as defined above in a liquid medium comprising one or more organic solvents.

The choice of the organic solvent is not particularly limited provided that it is suitable for solubilising the polymer ($F_f$) particles of the invention.

Non-limiting examples of organic solvents suitable for use in the composition (C) of the invention are typically selected from the group consisting of:
alcohols such as methyl alcohol, ethyl alcohol and diacetone alcohol,
ketones such as acetone, methylethylketone, methylisobutyl ketone, diisobutylketone, cyclohexanone and isophorone,
linear or cyclic esters such as isopropyl acetate, n-butyl acetate, methyl acetoacetate, dimethyl phthalate and γ-butyrolactone,
linear or cyclic amides such as N,N-diethylacetamide, N,N-dimethylacetamide, dimethylformamide and N-methyl-2-pyrrolidone, and
dimethyl sulfoxide.

The composition (C) of the invention may be easily processed into various articles.

The composition (C) of the invention is particularly suitable for use in a process for manufacturing an article, said process comprising processing, typically by casting, said composition (C).

Casting generally involves solution casting, wherein typically a casting knife, a draw-down bar or a slot die is used to spread an even film of the composition (C) across a suitable substrate.

According to a first embodiment of the invention, the present invention pertains to a process for manufacturing a film, said process comprising:
(1a) providing the composition (C) of the invention, and
(2a) processing, typically by casting, the composition (C) provided in step (1a) into a film.

Under step (2a) of the process for manufacturing a film, casting generally involves solution casting, wherein typically a casting knife, a draw-down bar or a slot die is used to spread an even film of the composition (C) across a suitable substrate. The substrate may be a porous substrate or a non-porous substrate.

The film of the invention typically comprises at least one layer comprising one or more polymer ($F_f$) particles of the invention.

The film of the invention is advantageously obtainable by the process according to this first embodiment of the invention.

The film of the invention is particularly suitable for use in various applications.

The film of the invention is especially suitable for use in a separator for electrochemical devices.

The separator for electrochemical devices of the invention typically comprises:
at least one film of the invention, and
optionally, adhered to said film (F), a substrate comprising one or more layers, preferably a porous substrate comprising one or more layers such as a porous substrate comprising at least one layer comprising at least one polyolefin.

The present invention thus also pertains to a process for manufacturing a separator for electrochemical devices, said process comprising:
(1b) providing the composition (C) of the invention, and
(2b) processing, typically by casting, the composition (C) provided in step (1b) onto a substrate.

Under step (2b) of the process for manufacturing a separator for electrochemical devices, casting generally involves solution casting, wherein typically a casting knife, a draw-down bar or a slot die is used to spread an even film of the composition (C) across a suitable substrate. The substrate may be a porous substrate or a non-porous substrate.

The substrate is preferably a porous substrate comprising one or more layers such as a porous substrate comprising at least one layer comprising at least one polyolefin.

Non-limiting examples of electrochemical devices include secondary batteries such as Lithium-ion secondary batteries.

According to a second embodiment of the invention, the present invention pertains to a process for manufacturing a filtration membrane, said process comprising:
(1c) providing the composition (C) of the invention,
(2c) processing, typically by casting, the composition (C) provided in step (1c) into a film, and
(3c) precipitating the film provided in step (2c) in a non-solvent medium.

Under step (3c) of the process for manufacturing a filtration membrane, casting generally involves solution casting, wherein typically a casting knife, a draw-down bar or a slot die is used to spread an even film of the composition (C) across a suitable substrate. The substrate may be a porous substrate or a non-porous substrate.

Different casting techniques are used depending on the final form of the membrane to be manufactured.

When the final product is a flat membrane, the film is typically obtainable by processing by casting onto a flat supporting substrate, typically a plate, a belt or a fabric, or another microporous supporting membrane, typically by means of a casting knife, a draw-down bar or a slot die.

The term "membrane" is used herein in its usual meaning, that is to say that it refers to a discrete, generally thin, interface that moderates the permeation of chemical species in contact with it, said membrane containing pores of finite dimensions.

Membranes containing pores homogeneously distributed throughout their thickness are generally known as symmetric (or isotropic) membranes; membranes containing pores which are heterogeneously distributed throughout their thickness are generally known as asymmetric (or anisotropic) membranes.

For the purpose of the present invention, by the term "non-solvent medium" it is meant a medium consisting of one or more liquid substances incapable of dissolving the polymer $(F_f)$ particles of the invention at a given temperature.

The non-solvent medium typically comprises water and, optionally, at least one organic solvent selected from alcohols or polyalcohols, preferably aliphatic alcohols having a short chain, for example from 1 to 6 carbon atoms, more preferably methanol, ethanol, isopropanol and ethylene glycol.

The non-solvent medium is generally selected among those miscible with the liquid medium used for the preparation of the composition (C).

The filtration membrane of the invention typically comprises at least one layer comprising one or more polymer $(F_f)$ particles.

The filtration membrane of the invention is advantageously obtainable by the process according to this second embodiment of the invention.

The filtration membrane of the invention is particularly suitable for filtration of various liquid phases and/or gas phases.

In a fourth instance, the present invention pertains to an electrode-forming composition [composition (E)] comprising:
    one or more polymer $(F_f)$ particles of the invention,
    at least one electroactive compound [compound (EA)],
    a liquid medium comprising one or more organic solvents,
    optionally, at least one conductive compound [compound (C)], and
    optionally, one or more additives.

The composition (E) of the invention preferably comprises:
    from 0.5% to 50% by weight, preferably from 1% to 30% by weight, more preferably from 5% to 20% by weight, with respect to the total weight of the composition (E), of one or more polymer $(F_f)$ particles,
    at least one electroactive compound [compound (EA)],
    a liquid medium comprising one or more organic solvents,
    optionally, at least one conductive compound [compound (C)], and
    optionally, one or more additives.

The composition (E) of the invention is typically obtainable by adding to the composition (C) of the invention at least one electroactive compound [compound (EA)], optionally, at least one conductive compound [compound (C)] and, optionally, one or more additives.

The composition (E) of the invention is particularly suitable for use in a process for manufacturing an electrode for electrochemical devices, said process comprising:

(1d) providing the composition (E) of the invention,
(2d) applying the composition (E) provided in step (1d) onto one surface of a metal substrate thereby providing a surface-coated electrode, and
(3d) drying the surface-coated electrode provided in step (2d).

The metal substrate typically acts as a metal collector.

The metal substrate is generally a foil, mesh or net made from a metal such as copper, aluminum, iron, stainless steel, nickel, titanium or silver.

The electrode of the invention is typically dried at a temperature comprised between 25° C. and 200° C.

Under step (3d) of the process for manufacturing an electrode for electrochemical devices, drying can be performed either under atmospheric pressure or under vacuum. Alternatively, drying can be performed under modified atmosphere, e.g. under an inert gas, typically exempt notably from moisture (water vapour content of less than 0.001% v/v). The drying temperature will be selected so as to effect removal by evaporation of one or more solvents (S) from the electrode of the invention.

The present invention thus also pertains to an electrode for electrochemical devices, said electrode comprising:
    one or more polymer $(F_f)$ particles of the invention,
    at least one electroactive compound [compound (EA)],
    optionally, at least one conductive compound [compound (C)], and
    optionally, one or more additives.

The electrode for electrochemical devices of the invention is advantageously obtainable by the process of the invention.

The electrode for electrochemical devices of the invention preferably comprises:
    from 0.1% to 15% by weight, preferably from 0.3% to 10%, by weight, with respect to the total weight of the electrode, of one or more polymer $(F_f)$ particles of the invention,
    from 99.9% to 85% by weight, preferably from 99.7% to 90% by weight, with respect to the total weight of the electrode, of at least one electroactive compound [compound (EA)],
    optionally, at least one conductive compound [compound (C)], and
    optionally, one or more additives.

The electrode of the invention is preferably free from one or more organic solvents.

Non-limiting examples of electrochemical devices include secondary batteries such as Lithium-ion secondary batteries.

For the purpose of the present invention, the term "electroactive compound [compound (EA)]" is intended to denote a compound which is able to incorporate or insert into its structure and substantially release therefrom alkaline or alkaline-earth metal ions during the charging phase and the discharging phase of an electrochemical device. The compound (EA) is preferably able to incorporate or insert and release Lithium ions.

The nature of the compound (EA) depends on whether the electrode is a positive electrode or a negative electrode.

In the case of forming a positive electrode for a Lithium-ion secondary battery, the compound (EA) may comprise a composite metal chalcogenide of formula $LiMQ_2$, wherein M is at least one metal selected from transition metals such as Co, Ni, Fe, Mn, Al, Cr and V and Q is a chalcogen such as O or S. Among these, it is preferred to use a Lithium-based composite metal oxide of formula $LiMO_2$, wherein M is the same as defined above. Preferred examples thereof may include $LiCoO_2$, $LiNiO_2$, $LiNi_xCo_{1-x}O_2$ (0<x<1) and spinel-structured $LiMn_2O_4$.

As an alternative, still in the case of forming a positive electrode for a Lithium-ion secondary battery, the compound (EA) may comprise a lithiated or partially lithiated transition metal oxyanion-based electro-active material of formula $M_1M_2(JO_4)_fE_{1-f}$, wherein $M_1$ is Lithium, which may be partially substituted by another alkali metal representing less than 20% of the $M_1$ metals, $M_2$ is a transition metal at the oxidation level of +2 selected from Fe, Mn, Ni, Al or mixtures thereof or at the oxidation level of +3 selected from V, Co or mixtures thereof, which may be partially substituted by one or more additional metals at oxidation levels between +1 and +5 and representing less than 35% of the $M_2$ metals, including 0, $JO_4$ is any oxyanion wherein J is either P, S, V, Si, Nb, Mo or a combination thereof, E is a fluoride, hydroxide or chloride anion, f is the molar fraction of the $JO_4$ oxyanion, generally comprised between 0.75 and 1.

The $M_1M_2(JO_4)_fE_{1-f}$ electroactive material as defined above is preferably phosphate-based and may have an ordered or modified olivine structure.

More preferably, the compound (EA) has formula $Li_{3-x}M'_yM''_{2-y}(JO_4)_3$ wherein $0 \leq x \leq 3$, $0 \leq y \leq 2$, M' and M'' are the same or different metals, at least one of which being a transition metal, $JO_4$ is preferably $PO_4$ which may be partially substituted with another oxyanion, wherein J is either S, V, Si, Nb, Mo or a combination thereof. Still more preferably, the compound (EA) is a phosphate-based electro-active material of formula $Li(Fe_xMn_{1-x})PO_4$ wherein $0 \leq x \leq 1$, wherein x is preferably 1 (that is to say, Lithium iron phosphate of formula $LiFePO_4$).

In the case of forming a negative electrode for a Lithium-ion secondary battery, the compound (EA) may preferably comprise:
  graphitic carbons able to intercalate Lithium, typically existing in forms such as powders, flakes, fibers or spheres (for example, mesocarbon microbeads) hosting Lithium;
  Lithium metal;
  Lithium alloy compositions, including notably those described in U.S. Pat. No. 6,203,944 (3M INNOVATIVE PROPERTIES CO.) Mar. 20, 2001 and/or in WO 00/03444 (MINNESOTA MINING AND MANUFACTURING CO.) Jan. 20, 2000;
  Lithium titanates, generally represented by formula $Li_4Ti_5O_{12}$; these compounds are generally considered as "zero-strain" insertion materials, having low level of physical expansion upon taking up the mobile ions, i.e. $Li^+$;
  Lithium-silicon alloys, generally known as Lithium silicides with high Li/Si ratios, in particular Lithium silicides of formula $Li_{4.4}Si$;
  Lithium-germanium alloys, including crystalline phases of formula $Li_{4.4}Ge$;
  Lithium-tin and Lithium-antimony alloys.

For the purpose of the present invention, the term "conductive compound [compound (C)]" is intended to denote a compound able to impart electron conductivity to the electrode.

The compound (C) is typically selected from the group consisting of carbonaceous materials such as carbon black, carbon nanotubes, graphite powder, graphite fiber and metal powders or fibers such as nickel and aluminium powders or fibers.

The composition (E) of the invention may further comprise one or more additives such as vinylene carbonate, vinyl ethylene carbonate, allyl ethyl carbonate, vinyl acetate, divinyl adipate, acrylic acid nitrile, 2-vinyl pyridine, maleic anhydride, methyl cinnamate, alkyl phosponates, and vinyl-containing silane-based compounds.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXPERIMENTAL SECTION

Determination of Intrinsic Viscosity of Vinylidene Fluoride Polymer Powder Particles Intrinsic viscosity ($\eta$) [dl/g] was measured using the following equation on the basis of dropping time, at 25° C., of a solution obtained by dissolving vinylidene fluoride polymer powder particles in N,N-dimethyl formamide at a concentration of about 0.2 g/dl using a Ubbelhode viscosimeter:

$$[\eta] = \frac{\eta_{sp} + \Gamma \cdot \ln \eta_r}{(1+\Gamma) \cdot c}$$

wherein c is polymer concentration [g/dl], $\eta_r$ is the relative viscosity, i.e. the ratio between the dropping time of sample solution and the dropping time of solvent, $\eta_{sp}$ is the specific viscosity, i.e. $\eta_r - 1$, and $\Gamma$ is an experimental factor, which for a vinylidene fluoride polymer corresponds to 3.

Determination of Particle Size Distribution (PSD) of Vinylidene Fluoride Polymer Powder Particles The particle size distribution was measured with a Mastersizer 2000 apparatus from Malvern Instruments Ltd. equipped with a Hydro 2000G sample dispersion unit using a He—Ne laser with a power source of 2 mW. The particle size distribution was measured on an aqueous solution prepared by dispersing vinylidene fluoride polymer powder particles in a solution containing 1 g of TRITON® X-100 non-ionic surfactant in 1 liter of ethanol.

Dissolution Time of Vinylidene Fluoride Polymer Powder Particles 3 g of vinylidene fluoride polymer powder particles were poured into a beaker containing 47 g of N-methyl 2-pyrolidone (NMP) under stirring, using a magnetic stirrer kept at 500 rpm, at room temperature, thereby obtaining a 6% w/w solution of said vinylidene fluoride polymer in NMP. After 15 seconds, the stirrer was stopped and a first visual inspection was done: depending on the type of powder, at this stage the presence of agglomerates of vinylidene fluoride polymer may be detected. The beaker containing the solution of the vinylidene fluoride polymer in NMP was then moved on a second magnetic stirrer, this time introduced in a heated bath kept at a higher temperature $T_{bath}$ 45° C. The magnetic stirrer was kept at 500 rpm. The time between the introduction of the beaker in the heated bath and the full dissolution, when the solution appears clear without any visible vinylidene fluoride polymer particles or any visible aggregates thereof, was recorded. The dissolution time according to this procedure was then given by the sum of the two steps: 15 seconds at room temperature and the time measured at $T_{bath}$ till dissolution. The test was stopped after a total dissolution time of 30 minutes. Should the dissolution time exceed 30 minutes, the test is failed.

Example 1: Preparation of Polymer 1 and Dispersion1 of Polymer 1

In a 4 liter reactor were introduced in sequence 2103 g of demineralized water and 1.76 g of ALCOTEX® 80 polyvinyl alcohol as suspending agent. The reactor was equipped with an impeller running at a speed of 880 rpm. The reactor was vented for three times and pressurized with nitrogen to 1 bar for two times at 20° C. Then, 4.1 g of a 75% by weight solution of t-amyl perpivalate initiator in isododecane and 0.5 g of acrylic acid (AA) monomer were introduced in the reactor, followed by 1164 g of vinylidene fluoride (VDF) monomer. The reactor was then gradually heated to 55° C. to a final pressure of 110 bar. The temperature was maintained constant at 55° C. and the pressure was kept constant at 110 bar during the whole experimentation by feeding a 14.4 g/l aqueous solution of AA monomer to a total of 857 g. The pressure was decreased until 90 bar and the polymerization run was stopped by degassing the suspension until reaching atmospheric pressure. The polymer so obtained was then recovered, washed with demineralized water several times.

A part of the wet polymer obtained after washings with water was dried in an oven-dried at 65° C. generating Polymer 1 Powder, that is VDF-Acrylic Acid (AA) (0.8% by moles) having an intrinsic viscosity of 0.29 l/g in DMF at 25° C. The D50 of the powder is 111.9 μm The rest of the wet polymer was added by fresh water leading to a 15% by weight aqueous dispersion: Dispersion1.

Example 2: Thermal Treatment of Dispersion1

Preparation of Dispersion1 as obtained in Example 1 was repeated several times to produce 15 Kg of Dispersion1 with a concentration of 15% w of Polymer 1 in water. Dispersion1 was charged into a 22 liter stirred reactor under vacuum. The temperature was fixed at 135° C. and stirring rate at 300 RPM. The final pressure inside the reactor was 3.7 bar(abs), given substantially by the water pressure. The dispersion was kept at these conditions for 60 minutes. After that, the reactor was cooled down up to 40° C. under stirring when the slurry was discharged. The dispersion was then filtrated and put in a fluidized bed with air at a temperature between 90 and 95° C. leading to Polymer (FT-A). The fluidization of the cake was very good and better than the non-treated cake.

No agglomeration or change in colour from the initial white colour of Polymer 1 obtained after polymerization in Example 1 was observed in the polymer particles of Polymer (FT-A) after the heat treatment and the drying.

Comparative Example 3: Thermal Treatment of Polymer1 Powder in Fluidized Bed Polymer1 powder was treated in fluidized bed at 135° C. for a total of 60 minutes.
  Operative conditions of the fluidized bed were as follows:
  Fluidized Bed (both configurations with and without fines recycling were tested)
  Volume: 30 L
  Hold up of product: min 1 kg-max 10 kg
  Air speed: min 20—max up to 70 cm/s (referred to the empty section of the bed)
  Operating temperature: 125-135° C.
  Residence time: 60 min after reaching the set point temperature
  Heating medium: hot air (the preheating was electrical or by steam)
  Operating parameters under monitoring: inlet temperature of the air, temperature of the bulk, pressure drop in the bed.

The powder became colored after 10 minutes in the fluidized bed. At the end of the treatment, Polymer 1TA was obtained as brown colored powder.

The heat was supplied exclusively by the inlet air. In order to minimize the heating time, the equipment was preheated before feeding the powder at ambient temperature. The inlet temperature of the air was the best compromise in order to minimize the heating time without the risk of powder melting or softening. The inlet temperature of the air was up to 10° C. higher than the temperature of the bulk of powder. The contact of the powder with hot surfaces (in particular the distribution grid) had to be avoided.

During the treatment, agglomeration of the Polymer1 particles was observed. The aggregation of particles increased with the increase of the residence time in the bed. Because of this tendency, it was difficult to maintain the particles motion and the good fluidization for all the duration of the test. In particular part of the product aggregated and consequently fell on the distribution plate. Partially softened or pre-melted product was found on the distribution plate at the end of the treatment.

The same treatment was carried out in the fluidized bed under nitrogen atmosphere. No improvement in the colour was seen, while the process was made more complicated by the use of cumbersome equipment.

Comparative Example 4: Thermal Treatment of Polymer1 Powder with Circulating Air Polymer1 powder was treated in an oven in the following operative conditions:
  Equipments: Oven
  Hold up of powder: 1 kg
  Operating temperature: 135° C.
  Residence time: 60 min
  Heating medium: electrical heating and air circulation The treatment in the oven led to Polymer1TB: colored polymer particles characterized by the formation of agglomerates. Even the shape of the polymer particles (spherical) not in the form of agglomerates resulted to be modified by the thermal treatment, becoming very irregular.

A slight improvement in colour could be achieved by making the treatment under nitrogen atmosphere, leading to lighter colour of the particles.

Example 5: Dissolution Time of Polymer 1, Polymer (Ft-a), Polymer1TA and Polymer1TB Dissolution test of the polymer powders obtained in Example 2, Comparative Example 3 and Comparative Example 4 was carried out as above defined.

The results are shown in Table 1.

TABLE 1

| | Polymer1 | Polymer(FT-A) | Polymer 1TA | Polymer 1TB |
|---|---|---|---|---|
| Dissolution time [min, $T_{bath}$ = 45° C.] | +30 | 5 | 15 | 10 |

The powder of the polymer treated according to the process of the invention shows a faster dissolution in NMP than the powders obtained by thermally treating the polymer in the form of powder.

Overall, the process of the invention shows several advantages in terms of colour and solubility of the polymer particles obtained, but also in terms of operative procedures and equipment required in comparison with thermal treatments performed on dry polymer powder by several methods available in the art. The thermal treatment of the process of the present invention can be carried out in line after the washings required after the polymerization reaction without the need for an intermediate drying. Temperature of the final drying is then the same as for non-treated powder, but drying is more efficient in terms of time, and thus in terms of energy required to completion.

The invention claimed is:

1. A process for manufacturing (semi)-crystalline vinylidene fluoride (VDF) polymer particles [polymer ($F_f$) particles], said process comprising:
   (i) providing an aqueous dispersion [dispersion (D)] consisting of an aqueous medium and of particles of at least one (semi)-crystalline VDF-based polymer [polymer (F) particles],
   (ii) thermally treating the dispersion (D) provided in step (i) at a temperature comprised in the range from 100 to 180° C., under stirring, and
   (iii) isolating polymer ($F_f$) particles from the thermally treated dispersion obtained in step (ii).

2. The process according to claim 1 wherein the dispersion (D) has a solid content of polymer (F) particles dispersed in aqueous medium ranging from 5 to 50% by weight.

3. The process according to claim 1, wherein the polymer (F) comprises at least 0.01% by moles of recurring units derived from at least one functional hydrogenated monomer, wherein the molar amounts of said recurring units are relative to the total moles of recurring units in said polymer (F).

4. The process according to claim 3, wherein the functional hydrogenated monomer is of formula (I):

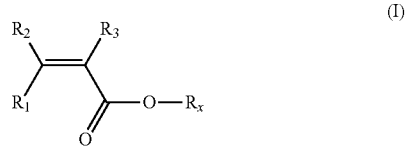

wherein each of $R_1$, $R_2$ and $R_3$, equal to or different from each other, is independently a hydrogen atom or a $C_1$-$C_3$ hydrocarbon group, and $R_x$ is a hydrogen atom or a $C_1$-$C_5$ hydrocarbon group comprising at least one hydroxyl group.

5. The process according to claim 1 wherein the polymer (F) particles are wet polymer (F) particles [(polymer (WF) particles].

* * * * *